Patented Feb. 3, 1925.

1,524,962

UNITED STATES PATENT OFFICE.

JEAN ALTWEGG AND CHARLES MAILLARD, OF LYON, FRANCE, ASSIGNORS TO SOCIETE CHIMIQUE DES USINES DU RHONE, OF PARIS, FRANCE.

PROCESS FOR THE MANUFACTURE OF MALONIC ACID ESTERS.

No Drawing. Application filed March 3, 1924. Serial No. 696,676.

*To all whom it may concern:*

Be it known that we, JEAN ALTWEGG, residing at Lyon, France, a citizen of the Confederation of Switzerland, and CHARLES MAILLARD, residing at Lyon, France, a citizen of the Republic of France, have invented certain new and useful Improvements in the Process for the Manufacture of Malonic Acid Esters, of which the following is a specification.

It is known that ethyl-oxalylacetate, when distilled with care, and super-heating is avoided, is partially dissociated into carbon monoxide and ethyl malonate (Ber. d. d. Chem. Gesell. Vol. 27, page 792). When operating on a commercial scale, however, it is not possible to avoid the formation of sub-products the boiling point of which is very high, and the quantity of these sub-products exceeds even considerably that of the malonate produced. For this reason, this reaction has not been made use of for the manufacture of ethyl malonate, which is an important intermediate product for a great number of syntheses.

We have found that, contrary to what had been admitted hitherto, it is not super-heating to a too high temperature which is the cause of the formation of the sub-products, but this formation is due to a too prolonged heating, even at moderate temperatures. We have noticed, as a matter of fact that rapid super-heating at high temperatures enhances, on the contrary, the formation of malonate, and prevents the formation of sub-products. The most favourable temperature is comprised between 300° and 350° C. which is quite unexpected, since it was believed that super-heating beyond 200° C. was prejudicial to the proper performance of the reaction. It has been noticed besides that the formation of sub-products can be avoided even in a more complete manner, that is, can be reduced to quantities practically negligible, by, instead of super-heating the oxalylacetate itself, super-heating vapours obtained by its vaporization under reduced pressure.

In order to carry out this reaction industrially, the oxalylacetic ester is run over a porous mass perliminarily heated to a temperature of from 250° to 350° C., or else the ester is vaporized under reduced pressure and the vapours are passed through a suitable apparatus heated to the required temperature. It is advantageous to carry the oxalylacetic ester rapidly to the selected temperature in order to avoid secondary reaction.

This reaction is not limited to ethyl oxalylacetate only; it is applicable to other oxalylacetates and it is particularly important in respect of compound oxalylacetates. By super-heating the latter, compound malonates are obtained, the preparation of which was not easy before the present invention.

Example I.

Ethyl oxalylacetate is run into a vertical tube filled with coke fragments heated to 310° C.; the vapours escaping at the bottom of the tube are condensed. In this manner there is obtained an oily product which is the ethyl malonate, containing a small quantity of tarry impurities; it is purified by rectification.

Example II.

The oxalylacetic ester is evaporated under a pressure of 5 mm. and the vapours are caused to pass into a tube filled with pumice stone fragments heated to 305° C. Pure ethyl malonate is obtained by condensation of the super-heated vapours.

Example III.

In Examples I and II, for ethyl oxalylacetate is substituted compound ethyl methyl oxalylacetate, obtained by condensation of ethyl oxalate with methyl acetate, according to known methods. Compound ethyl methyl malonate is obtained, which is an oil with an aromatic odour, density at 12° C. = 1.1083, distilling at 182° C. without decomposition.

Example IV.

By super-heating, as has been described in the preceding examples, compound ethyl normal butyl oxalylacetate, obtained by condensation of ethyl oxalate and butyl acetate, compound ethyl butyl malonate, boiling at 222° C. and the density of which is at 15° C. = 1.0257, is obtained.

What we claim and desire to secure by Letters Patent is:—

1. A process for the manufacture of malonic acid esters, consisting in rapidly heating oxalylacetic esters to a temperature of from 250° to 350° C.
2. A process for the manufacture of malonic acid esters, consisting in heating vapours of oxalylacetic esters under reduced pressure to a temperature of from 250° to 350° C.
3. A process for the manufacture of compound esters of malonic acid, consisting in rapidly heating oxalylacetic esters to a temperature of from 250° to 350° C.
4. A process for the manufacture of compound esters of malonic acid, consisting in heating vapours of oxalylacetic esters under reduced pressure to a temperature of from 250° to 350° C.
5. A process for the manufacture of compound ethyl butyl malonate by running compound ethyl butyl oxalylacetate into a tube filled with coke fragments heated to from 250° C. to 350° C., condensing the vapours, and purifying.

In testimony whereof, we affix our signatures.

JEAN ALTWEGG.
CHARLES MAILLARD.